April 5, 1966 W. R. BAILEY 3,244,189
FLUID VALVE DEVICE
Filed Oct. 4, 1963
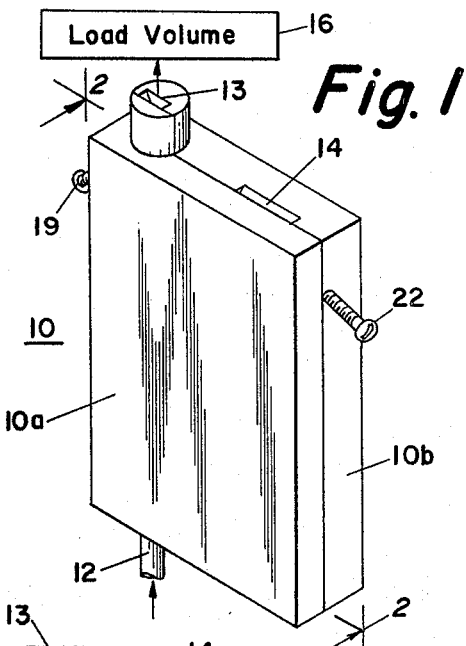
Fig. 1
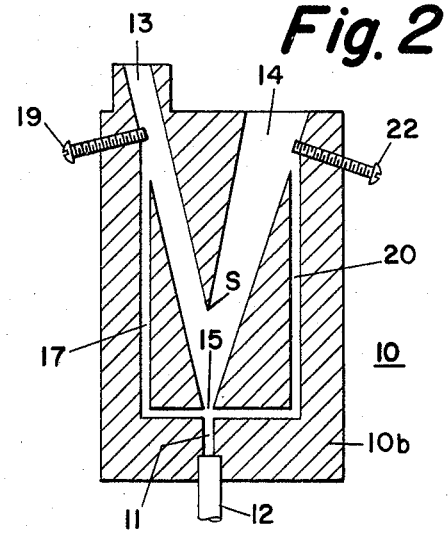
Fig. 2
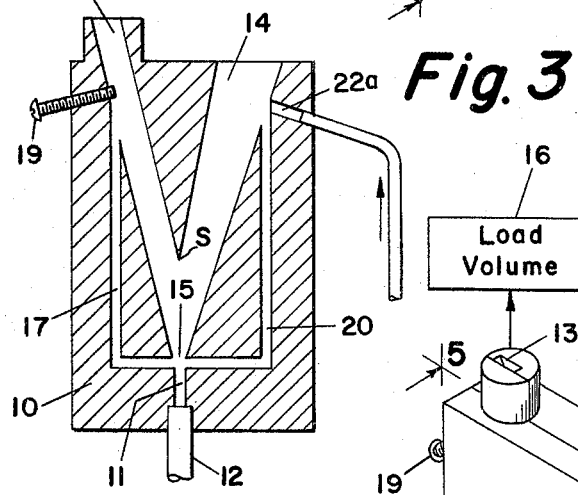
Fig. 3
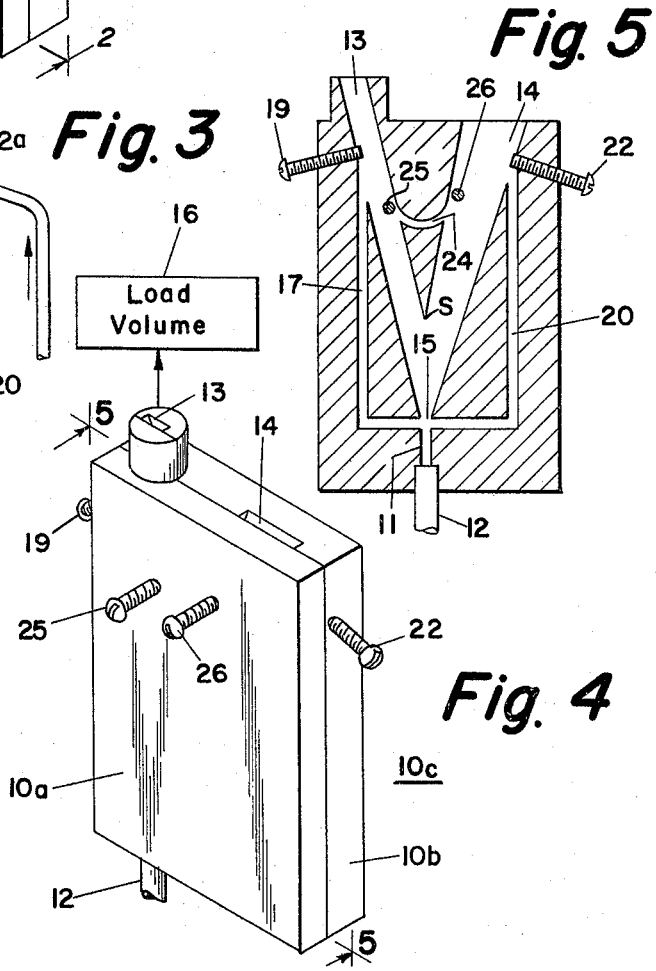
Fig. 5
Fig. 4

3,244,189
FLUID VALVE DEVICE
William Rugh Bailey, Cheyney, Pa., assignor to Feedback Systems, Inc., Boyertown, Pa., a corporation of Pennsylvania
Filed Oct. 4, 1963, Ser. No. 313,807
9 Claims. (Cl. 137—81.5)

This invention relates to a fluid-amplifier valve and method of operating the same and has for an object the provision of an improved fluid valve device which causes desirable flow patterns and responses through the introduction of controlled geometric distortions of the channels and insertion of intentional interferences in the fluid streams rather than the attempt to pick up and throttle a fluid pressure, as such, into the control-jet. In accordance with this new concept, there is produced an improved cycling valve which operates without entrainment or other contamination by the atmosphere or other circumambient fluid.

Fluid valve devices, of the type to which the present invention relates, are particularly suited for fluid amplifiers, pure-fluid oscillating and cycling valves, and resuscitator valves. In the prior art, such valves, in general, included an inlet power jet passage and a pair of outlet passages connected at a common junction to the inlet passage with the passages forming, in general, a Y-shaped configuration. These passages were made in a block of material with a pair of small control-jet passages or channels intersecting with the common junction from the left and right hand side thereof. In such prior art devices the flow from the power jet can be made to cling to either the left wall or right wall of the Y-shaped passages depending upon the admission of small flows into the side control channels. This result is obtained because of the partial vacuum which the power jet causes by aspiration. By controlling the admission of small flows into the two side control channels, the larger output flows and pressure may be efficiently diverted from one output passage to the other as desired and in the absence of moving mechanical parts.

For some purposes, such as the automatic generation of pulses for time measurement or other purposes, or the sequential diversion of flow for accomplishment of mixing, or for cyclic ventilation of containment volumes, or the lungs of animals or humans as for resuscitation, it is desirable that the cycling action of the valve be automatically or internally self-generating rather than the result of an externally applied control-jet flow. One way of accomplishing this in the prior art devices has been through the connection of one control-jet channel to the corresponding output channel or passage and directing that output channel into a closed volume which usually is the volume whose pressure is to be cycled. In such arrangement, the control-jet channel is connected at its opposite end to the common junction or interaction region and to one of the output channels adjacent its output end. With such arrangement of the valve for automatic cycling, the pressure of the load volume will be automatically cycled by the alternating diversion action, as described above, under the influence of the control-jet which is connected to the corresponding output channel. For ease of understanding, it will be assumed that this control-jet and its corresponding output channel are located at the left hand side of the aforementioned Y-shaped configuration. It has been the practice to utilize an adjustable control valve in the control-jet. Thus, the flow of the left control-jet is a function of the pressure at the output location of its connection to the left output channel, the throttling effect exerted by the control valve in the control-jet and the aspirating force developed by the power jet. In such device, the adjustment of the valve in the left control-jet is used primarily for the establishment of the peak pressure to which the load volume will be filled. When the inlet power jet switches to the right, flow is diverted from the left output channel to the right output channel which usually exhausts to ambient atmosphere. In the prior art, it has been the practice to construct the channels so that the fluid may be aspirated from the left hand output channel into the power stream and out the right hand output channel, thus, assisting in that phase of cycling during which the load volume is evacuated. The right hand control-jet is normally supplied from an external source and is provided with an adjustable valve which controls the flow through the right hand control-jet to the connection of the latter at the common junction or interaction region of the device.

The lower pressure limit to which the load volume will be evacuated prior to reversal of the cycling action of the device is a function of the throttling adjustment of the valve in the right hand control-jet, the aspirating effectiveness of the inlet power jet, and the degree of pressure or flow disturbance, if any, in the surrounding atmosphere to which the right control-jet and its valve have been directed and left open. The speed or frequency of pressure change and cyclic rate of a valve device of this type is a function of the throttling adjustment of the valve in the inlet power jet supply and the up-stream fluid supply pressure to the inlet power jet.

While such aforesaid valve devices of the prior art have been satisfactory for various purposes, they have left something to be desired in that they are subject to several disadvantages. One disadvantage of such prior valves has been the interaction between the various adjustments which are used to achieve cyclic action over the desired values of pressure, flow, and cyclic frequency. For example, when the inlet power jet flow is adjusted for increased flow, the increased aspirating power of the jet causes both control-jet flows to increase, thus, changing the values of pressure at which jet detachments and cycling reversals occur.

A second disadvantage in such prior art valves is due to the sensitivity of the valve to the magnitude of control-jet flow, such that changes in pressure, when desired to be reasonably large and useful magnitudes at the load volume, will be so powerful in their influence on control-jet flow that the adjustment valves in the control-jets must be used in a nearly closed position, making them undesirably sensitive to clogging by dirt or to the most minor accidental errors of positioning.

A third disadvantage of such prior art cycling valves has been their characteristic of mixing ambient atmospheric gas or other fluid from surrounding environment into the fluid stream being diverted or cycled. In mixing or proportioning applications, this dilutes the working fluid, in resuscitation it may contaminate it with noxious, filthy, or dangerous ambient gases or vapors, and in all applications it may deposit dirt or abrasive contents in the cycling valve passages or adjustment valves.

In accordance with the present invention, there is provided in a fluid cycling system the method of switching an inlet power flow between a pair of outlets comprising the steps of restricting the degree of expansion available to the power jet while pressurizing a load volume connected to one of the outlets, and recycling a portion of the power flow to the load volume and other outlet as a source of control-jet fluid to switch the inlet power flow between the load volume and the other outlet. The power flow is recycled by creating an interference in the paths of the power flow leading to the load volume and to the other outlet. More specifically, the switching to the load volume output is effected in part by a stream interference for capturing fluid from the other outlet. Such interference may be produced by a mechanical device in the other outlet or by a remotely originating flow directed into said other outlet. To adjust the net output flow rate and/or frequency of switching, a portion of the power flow is by-passed between the flows directed to the load volume and to the other outlet.

In accordance with another aspect of the present invention, there is provided a fluid valve device comprising an inlet power passage, and a pair of outlet passages connected at a common junction to the inlet passage, one of the outlet passages having a cross-sectional area smaller than that of the other. By connecting the load volume to the outlet passage of smaller cross-sectional area and by reason of the fact that the two output channels are unsymmetrical, the degree of expansion available to the power jet while pressurizing the load volume is restricted. Accordingly, by its dissymmetry, the valve device is capable of supplying an output flow to the outlet passage which is connected to the load volume without entrainment or aspiration of ambient fluid from the other output channel or passage.

Further in accordance with the present invention, the output channels of the valve device are each provided with control-jet channels, each having an end which connects at the common junction or interaction region of the valve device. The other end of one of the control-jet channels is connected to the output channel of smaller cross-sectional area up-stream of a fixed or adjustable interference which is adapted to interfere with the power jet output stream in that output channel. This control-jet channel and its associated interference are adapted to control the maximum-pressure limit to which the load volume will be subjected. A similar configuration of control-jet channel and interference associated with the other output channel performs a similar function in controlling the minimum-pressure limit. Since the control-jet flow is recaptured from the power stream, and since the configuration of output channels may be sufficiently unsymmetrical as to spill a small amount of the power jet flow out the larger channel even when the jet is attached to the smaller channel, no dilution of the main power output stream with ambient or atmospheric fluid will occur. This characteristic, in regard to the utility of the valve, is of great importance since the interferences associated with the control-jet channels may be either purely mechanical or may be formed by the injection of fluid streams from a remote source. This arrangement produces a valve which may be switched by a remote source whose output, due to dirt, temperature, or other cause is not suitable for direct injection as a control-jet fluid, but may be used as a recapture interference. Other utility results from the fact that the recapture interference need not be of the same fluid as is present in the valve to be controlled, and may even be composed of a flow of lumps, particles, or suspensions of solid materials.

For further object and advantages of the invention, reference is to be had to the following detailed description taken in conjunction with the accompanying drawings, in which:

FIG. 1 is a perspective view of a fluid valve device embodying the present invention;

FIG. 2 is a sectional view taken along the plane 2—2 in FIG. 1 and showing the various channels and associated mechanical interferences of the valve device;

FIG. 3 is a sectional view, similar to FIG. 2, of a modification where the interference for the right hand output channel is in the form of a remote control fluid source;

FIG. 4 is a perspective view of another modification of the present invention; and FIG. 5 is a sectional view taken along the plane 5—5 in FIG. 4.

Referring to FIG. 1, there is shown an improved fluid valve device 10 embodying the present invention. As may be seen in FIG. 2, the valve device 10 is provided with an inlet power jet passage 11 which is adapted to be connected to a suitable power jet supply by means of a connection 12. The device 10 is provided with a pair of outlet passages or output channels 13 and 14 connected at a common junction 15 to the inlet passage 11. It will be noted that while the output channels 13 and 14 form in combination with the input channel 11, a generally Y-shaped configuration, it will also be seen that the left hand output channel 13 has a cross-sectional area which is smaller than that of the output channel 14, thus, making the output channels unsymmetrical.

The fluid valve device 10, illustrated in FIGS. 1 and 2, is in the form of a cycling valve with the left hand output channel 13 being connected to a load volume 16. The other output channel 14, which is of larger cross-sectional area, is connected to ambient atmosphere. The output channels 13 and 14 are unsymmetrical in such manner as to restrict the degree of expansion available to the power jet 11 while pressurizing the load volume 16. Thus, the valve 10, by its dissymmetry, is capable of supplying an output flow to output channel 13 and to the load volume 16 without entrainment or aspiration of ambient fluid from the other output channel 14.

The valve device 10 may be made of any suitable material such for example, as metal or plastic. It is preferably made in two sections such as sections 10a and 10b. In the form illustrated the various channels have been molded or formed into the section 10b while the mating section 10a has been illustrated in the form of a flat plate which is adapted to be secured to the member 10b. The two sections 10a and 10b may be secured together in any suitable manner so as to form fluid type channels within the interior of the device 10.

Associated with the left output channel 13 is a small control channel 17 having one end connected to the common junction or interaction zone 15. The other end of the control channel 17 is connected to the output channel 13 up-stream of a fixed or adjustable interference 19 which is adapted to interfere with the power jet output stream through output channel 13. The interference device 19 has been illustrated as of the mechanical type in the form of an adjustable screw. The axis of the screw 19 preferably is perpendicular to the surface of the outlet channel 13 through which it extends. The junction of the interference 19 with the output channel 13 is such as to produce a degree of aspiration and, thus, a leftward flow at the left control jet 17. By inserting and increasing the projection of interference device 19 into the power jet stream, an impact or stagnation zone is produced which causes recapture of some of the flow from the power jet stream into the left control stream in channel 17. In this way, the degree of attachment of the power jet may be smoothly and predictably adjusted without the need of a throttle valve in the control channel 17. The interference device 19 provides for adjustment of the maximum-pressure limit in the load volume 16 and eliminates the need of small, dirt-sensitive, and difficult to adjust throttle valves heretofore used in the prior art.

As may be seen in FIGURE 2, a right control flow channel 20 of similar configuration to channel 17 is associated with the right output channel 14. The lower end of the right control flow channel 20 connects with the common junction or interaction zone 15. The opposite end of the control flow channel 20 is connected to the output channel 14 up-stream of a fixed or adjustable interference 22 which has been illustrated in the form of an adjustable screw member. The control flow channel 20 and the interference device 22 perform a similar function to that of control flow channel 17 and interference device 19 in controlling the minimum-pressure limit to which the load volume 16 is subject. It will be noted that with the configuration of flow channels as shown in FIG. 2, the control-jet flow is recaptured from the power stream, and since the configuration of channels 13 and 14 is sufficiently unsymmetrical as to spill a small amount of the power jet flow out through channel 14 even when the power jet is attached to the left wall of channel 13, no dilution of the main power output stream with ambient or atmospheric fluid will occur. The importance of this characteristic is greatly increased in regard to utility of the valve when it is understood that the interference devices 19 and 22 may be either purely mechanical as shown in FIG. 2 or may be formed by the injection of fluid streams from a remote source as shown by interference jet device 22a which is connected to an adjustable remote control fluid source as shown in FIG. 3. As may be seen in FIG. 3, the valve may be switched by a remote source through interference jet 22a whose output, due to dirt, temperature, or other cause is not suitable for direct injection as a control-jet fluid but may be used as a recapture interference. A further advantage results from the fact that the recapture interference need not be of the same fluid as is present in the valve 10 to be controlled, and may even be composed of a flow of lumps, particles or suspensions of solid materials.

Referring to FIGS. 4 and 5, there is shown a further modification of a valve device 10c which is similar to the valve device 10 shown in FIGS. 1 and 2 but includes additional features. As may be seen in FIG. 5, there is illustrated a flow channel 24 interconnecting the left output channel 13 and the right output channel 14 at a location intermediate the junction zone 15 and the output ports of the channels 13 and 14. Interference devices in the form of adjustable screws 25 and 26, FIGS. 4 and 5 extend through the upper plate 10a, FIG. 4, at locations adjacent the openings of channel 24 respectively into output channels 13 and 14. The channel 24 provides cyclic speed control by by-passing fluid from channel 13 to channel 14 and/or the reverse direction. The interference device 25 tends to promote flow from the output channel 13 to the output channel 14 during the period or interval of power jet attachment to output channel 13 and, thus, reduces the rate of pressurization of the load volume 16. The interference 26 tends to promote flow from output channel 14 to output channel 13 and, thus, reduces the rate of depressurization of the load volume 16. From the foregoing, it will be seen that this method of speed control does not alter the conditions in the interaction zone 15 and, therefore, induces no spurious effects on the pressure level at which the switching occurs.

As mentioned above, the fluid valve devices disclosed herein are particularly suited as resuscitator valves. When employed for such purposes, the inlet pressure at 11 will normally be relatively low; for example, in the order of one or two p.s.i. The pressure at 13 will be in the order of ±10 mm. of Hg gauge and 2 or 3 mm. of Hg gauge at 14. It is to be understood that the pressure range is not critical and that the pressures may be adjusted either up or down to provide the desired flow. The use of interference devices such as disclosed herein for recycling the fluid flow is particularly suited for low pressure applications.

In constructing the valve devices 10 and 10c, the point of the splitter s, FIGS. 2, 3 and 5, is postioned on the center line of the inlet passage 11. The width of the interaction zone 15 is normally the same width as the inlet passage 11 and the point of the splitter s is normally located above the interaction zone 15 about 13 times the width of the inlet passage. By way of example, where the inlet passage 11 has a width of $1/16''$, the point of the splitter s will be located $13/16''$ above the interaction zone 15. Such spacing has been found suitable for enabling the valve device to cycle from one outlet channel to the other. The outlet channel 13, as indicated above, has a cross-sectional area less than that of the throat of the outlet channel 14. In a typical example, the width of channel 13 may be in the order of $3/16''$ throughout its entire length and the channel 14 may have a width at the throat of about $1/4''$ and tapered to about $3/8''$ at the exit. The depths of the channels 13 and 14 are usually the same and in this example, have a depth in the order of $1/8''$. By using channels having a uniform depth, the flow rate may be changed by changing the depth of the channels. The control channels 17 and 20 may have the same width as the inlet channel 11, however, they are usually of smaller width. For example, when the inlet channel 11 has a width in the order of $.060''$ the control channels 17 and 20 are narrower, having a width in the order of $.030''$ to $.040''$. The depth of the channels 11, 17 and 20 are usually the same as the depths of channels 13 and 14. The diameters of the interference screws 19 and 22 are the same as the depth of the corresponding outlet channels 13 and 14. Thus, when channels 13 and 14 have a depth of $1/8''$, the screws 19 and 22 will have a corresponding diameter of $1/8''$ to close the channel at that location. The surface finish on the channels is reasonably smooth as produced by conventional manufacturing techniques and need not be of a mirror finish.

While the preferred form of the invention has been described and illustrated in connection with a fluid valve device having dissimilar outlet channels which construction has particular utility in regard to valves for resuscitators, it is to be understood that certain features of the valve construction have utility where the outlet channels are symmetrical. In this connection, it is to be noted that the interference means in the outlet channels may both be mechanical as illustrated in FIG. 2 or they may both be in the form of an interference jet device such as device 22a shown in FIG. 3. It is also to be understood that a load volume may be connected to either or both of the outlet channels for certain applications.

It is to be understood that the present invention is not limited to the specific arrangements illustrated and that further modifications thereof may be made within the scope of the appended claims.

What is claimed is:

1. A fluid valve device comprising an inlet power channel and a pair of outlet channels connected at a common junction to said inlet channel, a pair of control channels each respectively connected to one of said outlet channels and to said common junction, and interference means positioned in each of said outlet channels down-stream from the control channel connection thereto, said interference means in at least one of said outlet channels comprising a normally fixed structure adjustably projecting into said outlet channel through a wall thereof.

2. A fluid valve device according to claim 1 wherein one of said outlet channels has a cross-sectional area smaller than that of the other.

3. A fluid valve device according to claim 1 wherein said interference means in both of said outlet channels each comprises a normally fixed structure adjustably projecting into the corresponding outlet channel through a wall thereof.

4. A fluid valve device comprising an inlet power channel and a pair of outlet channels connected at a common junction point to said inlet channel, a pair of control channels each respectively connected to one of said outlet channels and to said common junction, and interference means positioned in each of said outlet channels down-stream from the control channel connection thereto, at least one of said interference means being adjustable separately from said control channels, and said interference means in at least one of said outlet channels comprising a jet interference.

5. A fluid valve device comprising an inlet power channel and a pair of outlet channels connected at a common junction point to said inlet channel, a pair of control channels each respectively connected to one of said outlet channels and to said common junction, interference means positioned in each of said outlet channels down-stream from the control channel connection thereto, at least one of said interference means being adjustable separately from said control channels, and a by-pass channel interconnecting said pair of outlet channels up-stream from the connections of said control channels to said outlet channels.

6. A fluid valve device according to claim 5 including means for controlling the flow through said by-pass channel.

7. A fluid valve device according to claim 6 wherein said means for controlling the flow through said by-pass channel comprises interference means in each of said outlet channels associated with the corresponding ends of said by-pass channel.

8. A fluid valve device comprising a body having disposed therein an inlet power channel and a pair of outlet channels connected at a common junction to said inlet channel, a pair of control channels in said body each respectively connected to one of said outlet channels and to said common junction, interference means in each of said outlet channels associated with each of said control channels, said interference means being positioned downstream from the connections of said control channel to said outlet channels, at least one of said interference means comprising an adjustable screw device projecting through a wall of the corresponding one of said outlet channels, the axis of said adjustable screw device being perpendicular to said wall of said outlet channel and said adjustable screw device being adjustable along said axis.

9. A fluid valve device according to claim 8 wherein both of said interference means comprise adjustable screw devices which are adjustable transversely of said outlet channels.

References Cited by the Examiner
UNITED STATES PATENTS

| | | | |
|---|---|---|---|
| 3,024,805 | 3/1962 | Horton | 137—81.5 |
| 3,111,931 | 11/1963 | Bodine | 137—81.5 |
| 3,148,691 | 9/1964 | Greenblott | 137—81.5 |
| 3,159,168 | 12/1964 | Reader | 137—81.5 |
| 3,159,208 | 12/1964 | Joesting | 137—81.5 |
| 3,176,920 | 4/1965 | Severson | 137—81.5 |

M. CARY NELSON, *Primary Examiner.*

LAVERNE D. GEIGER, *Examiner.*

W. CLINE, *Assistant Examiner.*